United States Patent
Lampugnani

(10) Patent No.: US 6,758,534 B2
(45) Date of Patent: Jul. 6, 2004

(54) MOUNTING ELEMENT FOR THE WHEELS OF ROLLING CONTAINERS

(75) Inventor: Umberto Lampugnani, Milan (IT)

(73) Assignee: Ghepard, S.r.L., Bologna (IT)

( * ) Notice: Subject to any disclaimer, the term of this patent is extended or adjusted under 35 U.S.C. 154(b) by 0 days.

(21) Appl. No.: 10/342,811

(22) Filed: Jan. 15, 2003

(65) Prior Publication Data

US 2003/0137189 A1 Jul. 24, 2003

(30) Foreign Application Priority Data

Jan. 23, 2002 (IT) .................................. BO2002A0029

(51) Int. Cl.⁷ .......................... B60B 35/00; A47B 91/00
(52) U.S. Cl. ................ 301/111.05; 301/119; 190/18 A; 16/44; 280/65; 280/124.179
(58) Field of Search ...................... 301/111.01, 111.05, 301/111.07, 119; 190/18 A; 16/18 R, 44, 45, 46; 280/47.24, 47.22, 65, 124.128, 124.179

(56) References Cited

U.S. PATENT DOCUMENTS

| | | | |
|---|---|---|---|
| 2,738,542 A | | 3/1956 | Clark, Jr. |
| 2,885,720 A | * | 5/1959 | Seeberger ...................... 16/44 |
| 2,925,283 A | * | 2/1960 | Stilger .......................... 280/37 |
| 4,397,062 A | * | 8/1983 | Huang ........................... 16/33 |
| 4,453,737 A | * | 6/1984 | Burchard et al. ..... 280/124.116 |
| 4,524,482 A | * | 6/1985 | Mueller .......................... 16/44 |
| 5,103,530 A | | 4/1992 | Andrisin, III et al. |
| 5,873,145 A | * | 2/1999 | Chou ............................ 16/46 |
| 6,382,736 B1 | * | 5/2002 | Chang ................... 301/111.05 |
| 6,532,623 B1 | * | 3/2003 | Watanabe .................. 16/35 D |

FOREIGN PATENT DOCUMENTS

| | | |
|---|---|---|
| GB | 860352 | 2/1961 |
| GB | 861382 | 2/1961 |
| WO | WO 01/39625 A1 | 4/2001 |
| WO | WO 01/39625 A2 | 6/2001 |

OTHER PUBLICATIONS

International Search Report corresponding to EP Application No. EP 03 42 5028.

* cited by examiner

Primary Examiner—Russell D. Stormer
(74) Attorney, Agent, or Firm—Fay, Sharpe, Fagan, Minnich & McKee, LLP

(57) ABSTRACT

A mounting element for the wheels of rolling containers comprises: a load-bearing member rigidly attachable to a bottom edge of a container designed to be rolled along a surface; an arm supporting at least one wheel designed to enable the container to be rolled on the surface; a pivot connecting the load-bearing member to the arm; and a helical spring located between load-bearing member and the arm. The latter, together with the load-bearing member defines a substantially sealed chamber within which the spring is enclosed and protected, and presents three end portions located at respective vertices of a triangle, a first portion being rotatably attached to the pivot, a second portion rotatably supporting the wheel and a third portion being attached to the spring.

21 Claims, 2 Drawing Sheets

MOUNTING ELEMENT FOR THE WHEELS OF ROLLING CONTAINERS

BACKGROUND OF THE INVENTION

The present invention relates to a mounting element for the wheels of rolling containers.

More specifically, the present invention, which can be very advantageously applied to the manufacture of travel containers such as suitcases and other items of luggage, relates to a mounting element capable of absorbing the shocks transmitted to the wheels as they roll over irregular or bumpy surfaces such as floors with steps, holes, etc.

A wheel mounting element of this kind is known, for example, from patent application WO 01/39625 and comprises a housing rigidly attached to a bottom edge of a bag, and a wheel mounting strut member mounted in the housing and pivoted to the latter to allow rotation from a first to a second position against the opposing action of a spring.

The wheel is rotatably mounted at a bottom end of the strut member, opposite the end that is pivoted to the housing, the strut member being substantially vertically aligned in all its working positions, including those between the first and second positions. The spring extends around an axis transversal to the strut member and is arranged between an inside surface of the housing at an intermediate portion of the strut member.

This type of mounting element, however, has several disadvantages.

A first disadvantage is due to the fact that the spring is exposed to dust and dirt since the housing is a substantially open structure. In the long run, the dust and dirt that accumulates in the housing hinders correct swinging of the strut member.

A second disadvantage is that, if the spring is not sufficiently rigid, even the slightest shocks caused by small bumps in the surface on which the bag is rolling causes the wheel mounting strut member to swing considerably. That means, on the one hand, that the bag tends to bounce up and down and, on the other, that the strut member easily reaches its limit position, that is to say, the aforementioned second position, where the spring is fully compressed and unable to absorb the shocks, which are thus discharged onto the bag and its contents.

SUMMARY OF THE INVENTION

The present invention has for an object to provide a mounting element for travel containers capable of absorbing the shocks transmitted to the wheels as they roll over irregular or bumpy surfaces and which, at the same time, overcomes the above mentioned disadvantages.

Another object of the present invention is to provide a mounting element for the wheels of rolling containers that is simple and economical to construct and, at the same time, relatively robust.

Accordingly, the present invention provides a mounting element for the wheels of travel containers comprising: a load-bearing member rigidly attachable to a bottom edge of a container designed to be rolled along a surface; an arm supporting at least one wheel designed to enable the container to be rolled on the surface; a pivot connecting the load-bearing member to the arm; and means for absorbing mechanical energy located between load-bearing member and the arm; the arm presenting a first portion that is rotatably attached to the pivot, a second portion that rotatably supports the wheel, and a third portion coupled with the mechanical energy absorbing means; wherein the load-bearing member and the arm define a substantially sealed chamber within which the mechanical energy absorbing means are enclosed and protected at each of the positions of the load-bearing member and of the arm.

Preferably, the first and second portions are three end portions of the arm positioned at the vertices of a triangle.

Further, the distance between the first and second portions is smaller than the distance between the first and third portions.

BRIEF DESCRIPTION OF THE DRAWINGS

The invention will now be described with reference to the accompanying drawings which illustrate a preferred non-restricting embodiment of it and in which.

DESCRIPTION OF THE PREFERRED EMBODIMENTS

Figure 1:
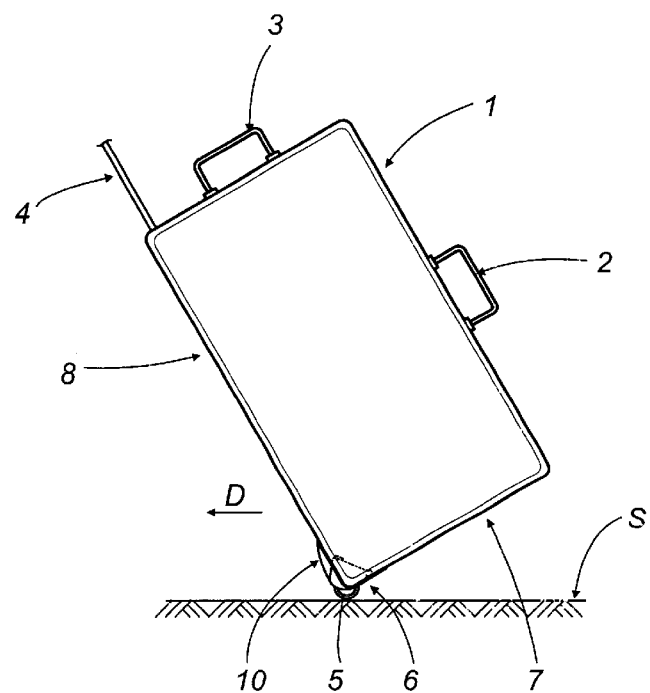
FIG. 1 schematically illustrates a suitcase whose wheels are each supported by a mounting element according to the present invention.

FIG. 1 shows a substantially box-shaped suitcase 1 equipped, on two contiguous lateral faces of it, with a first handgrip 2 and a second handgrip 3. On the side opposite the handgrip 2, the suitcase 1 has a telescopic handle 4 which can be pulled out from the side of the handgrip 3 to enable the suitcase 1 to be rolled along a surface S in a direction D on a pair of wheels 5 (of which only one is shown in FIG. 1).

The wheels 5 are positioned with their axes of rotation aligned and parallel with a short edge 6 of the suitcase 1 defined by the lateral face 7 opposite the handgrip 3 and by the lateral face 8 along which the handle 4 extends.

Figure 2:
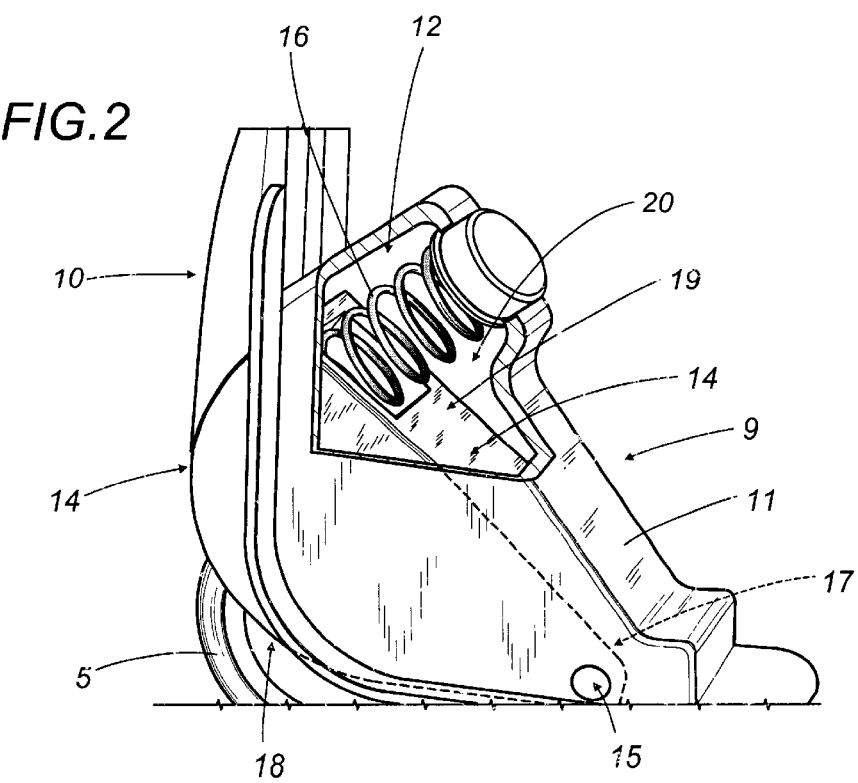
FIG. 2 is a perspective view, partly in cross section for clarity, of a preferred embodiment of the wheel mounting element according to the present invention.
Figure 3:
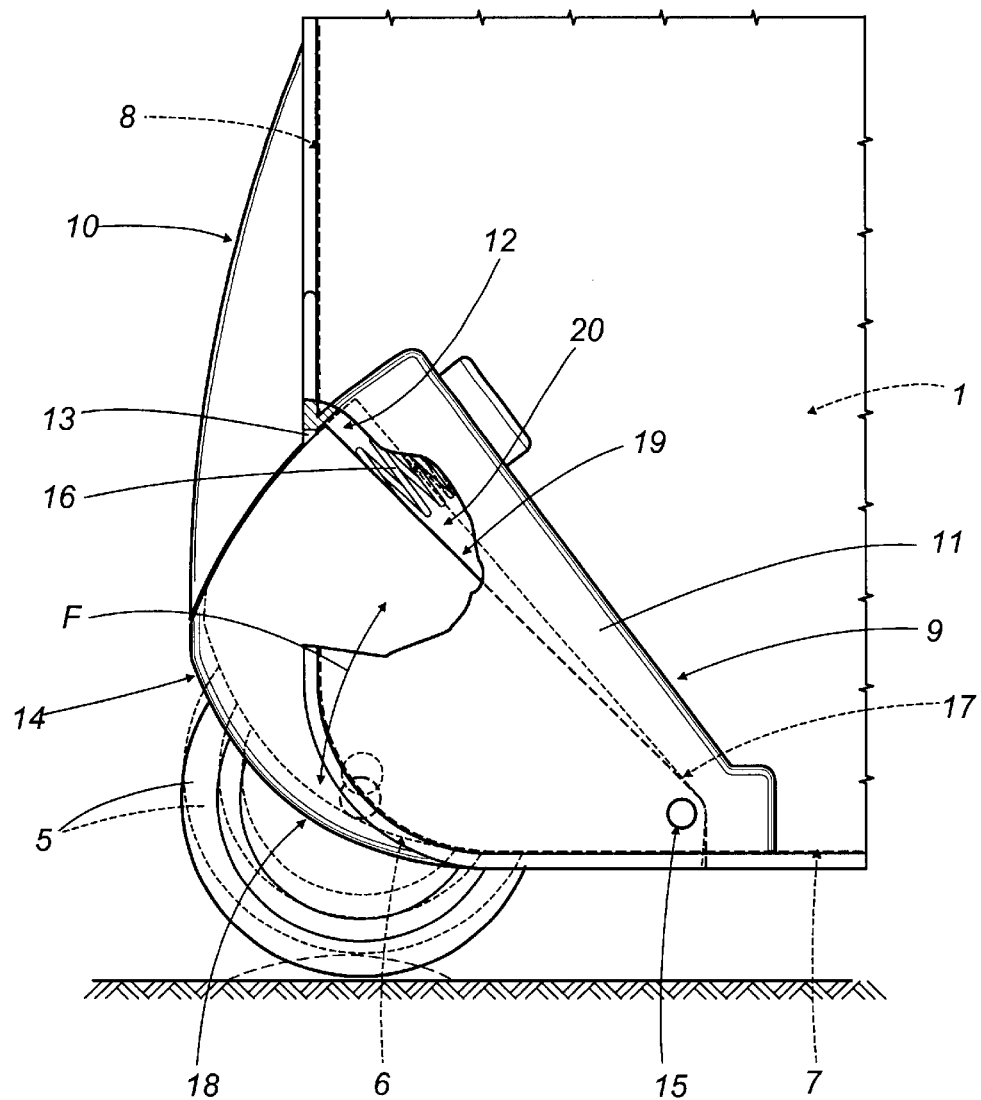
FIG. 3 is a side view, with some parts cut away in order to better illustrate others, of the mounting element of FIG. 2 in a second working configuration.

As illustrated in FIGS. 2 and 3, each wheel 5 is rotatably supported by a mounting element labeled 9 in its entirety.

The element 9 comprises a load-bearing member 10 that is rigidly attached to a lower end of the suitcase 1 encompassing the above mentioned short edge 6. The load-bearing member 10 defines a housing 11 having a cavity 12 formed on the inside of the perimeter of the suitcase 1.

The cavity 12 has a prismatic shape whose longitudinal section, lying in a plane orthogonal to the faces 7 and 8, is substantially in the shape of a trapezium having one side lying in substantially the same plane as the face 7, one side lying in substantially the same plane as the face 8 and the remaining two sides positioned on the inside of the perimeter of the suitcase 1.

The cavity 12 also presents an L-shaped slot 13 extending across the edge 6, that is to say, having one section lying in substantially the same plane as the face 7, at right angles to the face 8, and the other section lying in substantially the same plane as the face 8, at right angles to the face 7.

The element 9 further comprises an arm 14 supporting the wheel 5, a pivot 15 connecting the load-bearing member 10 to the arm 14, and a helical spring 16 positioned between the load-bearing member 10 and the arm 14.

The pivot 15 is positioned close to the face 7, facing the face 7 itself and with its axis parallel to the edge 6.

The arm 14 is housed partly inside the cavity 12 of the housing 11 from which it protrudes through the slot 13. The arm 14 is slightly less thick than the slot 13 is wide and the latter is preferably surrounded by an annular brush.

The arm 14 has a prismatic shape whose longitudinal section, lying in a plane orthogonal to the faces 7 and 8, is substantially in the shape of a triangle.

More specifically, the arm 14 has three end portions each located at one of the vertices of the triangle, a first portion being rotatably attached to the pivot 15, a second portion 18, being rounded and rotatably supporting the wheel 5, and a third portion 19 being connected to the spring 16.

When the suitcase 1 is being pulled in the direction D, the first portion 17 is positioned behind the second and third portions 18 and 19. Also, the distance between the portions 17 and 18 is smaller than the distance between the portions 17 and 19, so that, even with a relatively soft spring 16, the arm 14 does not bounce even if subjected to relatively strong shocks while at the same time allowing the spring 16 sufficient movement to absorb shocks.

The portions 17 and 18, on one side, and the portion 17 and 19, on the other, delimit respective, substantially planar faces of the arm 14, while the portions 18 and 19 delimit a curved surface joining the planar faces and protruding through the slot 13.

If the suitcase 1 is subjected to a shock while it is being pulled in the direction D, the arm 14 rotates about the pivot 15 (see arrows F in FIG. 3), against the opposing action of the spring 16, from an outermost first position (shown in FIG. 2) to a second position further in the suitcase 1 (shown in FIG. 3) sliding through the slot 13.

In all the positions between and including the above mentioned first and second positions, the portion 19 is always inside the cavity 12. The portion 19 is prevented from coming out of the cavity 12 by stop means which are not illustrated.

Also, in all the positions of the arm 14 relative to the load-bearing member 10, the housing 11 and the arm 14 define a substantially sealed chamber within which the spring 16 is enclosed and protected.

More specifically, the opening in the cavity 12, defined by the slot 13, is always substantially sealed by the arm 14 at all the positions of the latter relative to the suitcase 1.

It should be emphasized that the expression "substantially sealed" means sealed against dust and dirt that can by raised by the wheel 5 as it rolls on the surface S.

It will be understood that the invention, of which only some embodiments have been described, may be modified and adapted in several ways without thereby departing from the scope of the inventive concept. Moreover, all the constructional details may be substituted by technically equivalent elements.

What is claimed is:

1. A mounting element for the wheels of rolling containers comprising: a load-bearing member rigidly attachable to a bottom edge of a container designed to be rolled along a surface; an arm supporting at least one wheel designed to enable the container to be rolled on the surface; a pivot connecting the load-bearing member to the arm; and means for absorbing mechanical energy located between the load-bearing member and the arm; the arm presenting a first portion that is rotatably attached to the pivot, a second portion that rotatably supports the wheel, and a third portion coupled with the mechanical energy absorbing means; wherein the load-bearing member and the arm define a substantially sealed chamber within which the mechanical energy absorbing means are enclosed and protected at each of the positions of the load-bearing member and of the arm.

2. The mounting element according to claim 1, wherein the first, second and third portions are three end portions of the arm located at respective vertices of a triangle.

3. The mounting element according to claim 2, wherein the distance between the first and second portions is smaller than the distance between the first and third portions.

4. The mounting element according to claim 1, wherein the mechanical energy absorbing means are elastic means; the arm being designed to rotate about the pivot from a first to a second position against the opposing action of the elastic means.

5. The mounting element according to claim 4, wherein the elastic means comprise a helical spring.

6. The mounting element according to claim 1, wherein the arm has a prismatic shape with a substantially triangular longitudinal section.

7. The mounting element according to claim 1, wherein the load-bearing member defines a housing having a cavity within it; the arm being housed at least partly inside the housing.

8. The mounting element according to claim 7, wherein the cavity has a prismatic shape with a substantially trapezoidal longitudinal section.

9. The mounting element according to claim 7, wherein the housing has a slot through which the arm can slide while providing a substantial seal.

10. The mounting element according to claim 7, wherein the cavity, together with the arm, defines the chamber, and has an opening consisting of a slot through which the arm can slide relative to the load-bearing member; the arm substantially sealing the opening at all its positions relative to the load-bearing member.

11. The mounting element according to claim 1, wherein, when the container is being pulled in the direction, the first portion is positioned behind the second and third portions.

12. A rolling container comprising at least one mounting element according to claim 1.

13. The mounting element according to claim 2, wherein the mechanical energy absorbing means are elastic means; the arm being designed to rotate about the pivot from a first to a second position against the opposing action of the elastic means.

14. The mounting element according to claim 3, wherein the mechanical energy absorbing means are elastic means; the arm being designed to rotate about the pivot from a first to a second position against the opposing action of the elastic means.

15. The mounting element according to claim 2, wherein the arm has a prismatic shape with a substantially triangular longitudinal section.

16. The mounting element according to claim 2, wherein the load-bearing member defines a housing having a cavity within it; the arm being housed at least partly inside the housing.

17. The mounting element according to claim 8, wherein the housing has a slot through which the arm can slide while providing a substantial seal.

18. The mounting element according to claim 9, wherein the cavity, together with the arm, defines the chamber, and has an opening consisting of a slot through which the arm can slide relative to the load-bearing member; the arm substantially sealing the opening at all its positions relative to the load-bearing member.

19. The mounting element according to claim 2, wherein, when the container is being pulled in the direction, the first portion is positioned behind the second and third portions.

20. A rolling container comprising at least one mounting element according to claim 2.

21. A mounting element for the wheels of rolling containers comprising: a load-bearing member rigidly attachable to a bottom edge of a container designed to be rolled along a surface; an arm supporting at least one wheel designed to enable the container to be rolled on the surface; a pivot connecting the load-bearing member to the arm; and means for absorbing mechanical energy located between the load-bearing member and the arm; the arm presenting a first portion that is rotatably attached to the pivot, a second portion that rotatably supports the wheel, and a third portion coupled with the mechanical energy absorbing means; wherein the load-bearing member defines a housing having a cavity within it; the arm being housed at least partly inside the housing; the cavity, together with the arm, defining a substantially sealed chamber and having an opening consisting of a slot through which the arm can slide relative to the load-bearing member; the arm substantially sealing the opening at all its positions relative to the load-bearing member; the mechanical energy absorbing means being enclosed and protected inside the substantially sealed chamber at each of the positions of the load-bearing member and of the arm.

* * * * *